(12) United States Patent
Yasumura

(10) Patent No.: US 6,396,717 B2
(45) Date of Patent: May 28, 2002

(54) SWITCHING POWER SUPPLY HAVING AN IMPROVED POWER FACTOR BY VOLTAGE FEEDBACK

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/901,281

(22) Filed: Jul. 9, 2001

(30) Foreign Application Priority Data

Jul. 11, 2000 (JP) ........................................ 2000-215859
Jul. 14, 2000 (JP) ........................................ 2000-218740

(51) Int. Cl.$^7$ ............................................ H02M 3/335
(52) U.S. Cl. .............................. 363/21.02; 363/21.03; 363/97
(58) Field of Search ........................ 363/19, 20, 21.01, 363/21.02, 21.03, 97

(56) References Cited

U.S. PATENT DOCUMENTS

| | | | | |
|---|---|---|---|---|
| 4,736,283 | A | * 4/1988 | Yasumura | 363/19 |
| 5,644,480 | A | 7/1997 | Sako et al. | 363/17 |
| 5,737,207 | A | * 4/1998 | Uratani et al. | 363/132 |
| 5,798,616 | A | * 8/1998 | Takehara et al. | 315/247 |
| 6,163,139 | A | * 12/2000 | Symonds | 323/222 |
| 6,262,897 | B1 | * 7/2001 | Yasumura | 363/21.02 |
| 6,278,620 | B1 | * 8/2001 | Yasumura | 363/19 |
| 6,297,976 | B1 | * 10/2001 | Isono | 363/65 |
| 6,301,129 | B1 | * 10/2001 | Yasumura | 363/21.03 |
| 6,310,786 | B1 | * 10/2001 | Yasumura | 363/21.03 |
| 6,317,337 | B1 | * 11/2001 | Yasumura | 363/21.04 |

FOREIGN PATENT DOCUMENTS

| | | | |
|---|---|---|---|
| EP | 0707376 | 4/1996 | ............ H02M/1/00 |
| JP | 10225121 | 8/1998 | ............ H02M/3/28 |
| WO | 9916163 | 4/1999 | ............ H02M/1/00 |

OTHER PUBLICATIONS

H. Kheraluwala et al. "Performance Characterization of a High Power Factor Power Supply with a Single Power Stage," Proceedings of the Industry Applications Society Annual Meeting, Houston, Oct. 4, 1992.

* cited by examiner

*Primary Examiner*—Adolf Deneke Berhane
(74) *Attorney, Agent, or Firm*—Jay H. Maioli

(57) ABSTRACT

A switching power supply circuit formed by providing a complex resonance type converter with a power factor improving circuit feeds back a voltage resonance pulse voltage generated in a primary-side voltage resonance converter to fast recovery type diodes via a tertiary winding or the tertiary winding and a series resonant capacitor by magnetic coupling to thereby improve a power factor to 0.9, and achieves an improvement in AC/DC conversion efficiency and a reduction in a ripple component of a direct-current output voltage by voltage doubler rectifier operation. Also, a first rectifier circuit and a second rectifier circuit shunt the current to be stored in a smoothing capacitor, so that a range of zero volt switching operation is not narrowed even when the power factor is improved.

5 Claims, 12 Drawing Sheets

F I G. 5A
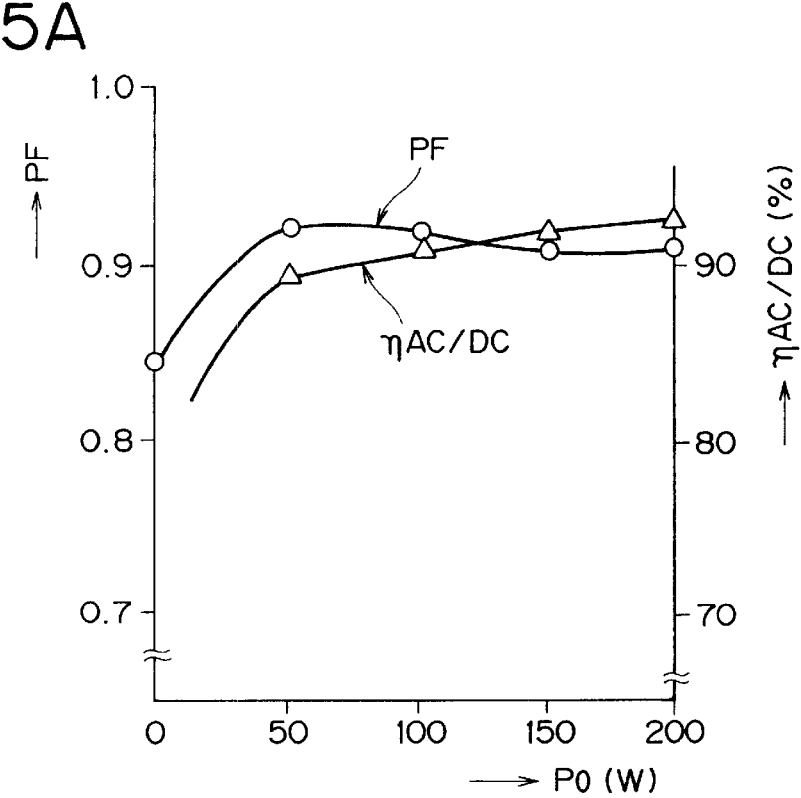
F I G. 5B
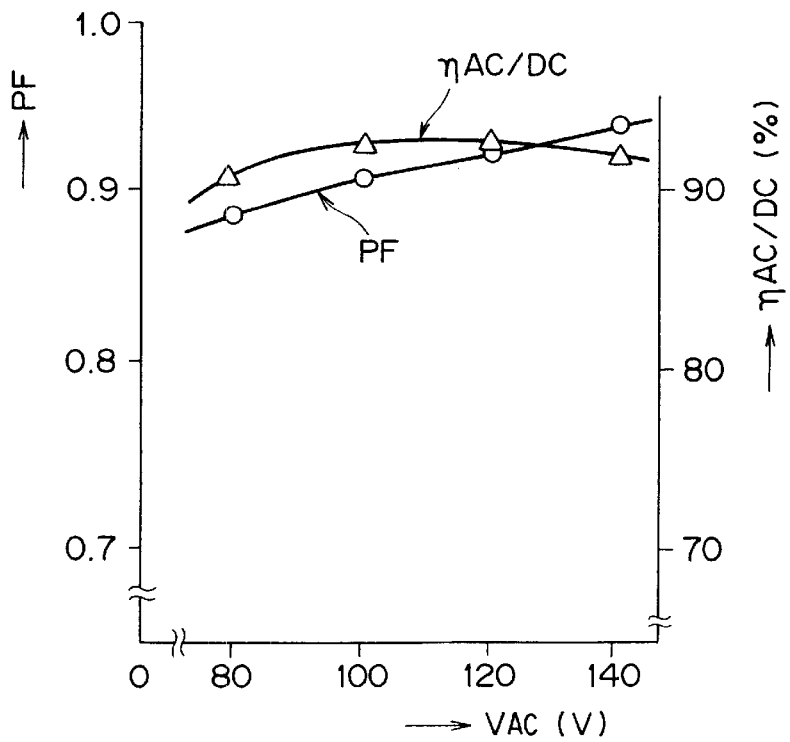

F I G. 7A  VAC 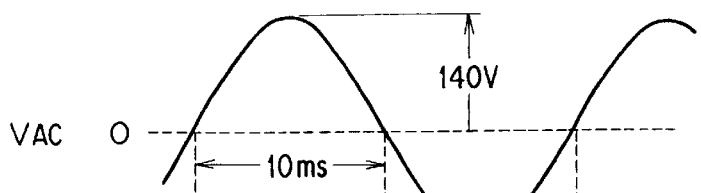
F I G. 7B  IAC 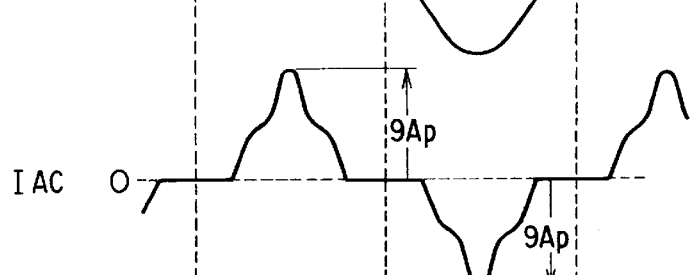
F I G. 7C  I2 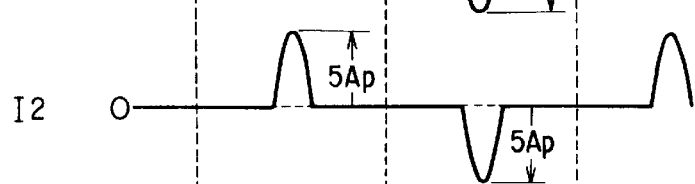
F I G. 7D  I3 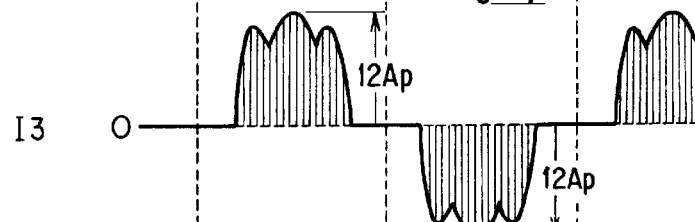
F I G. 7E  I1 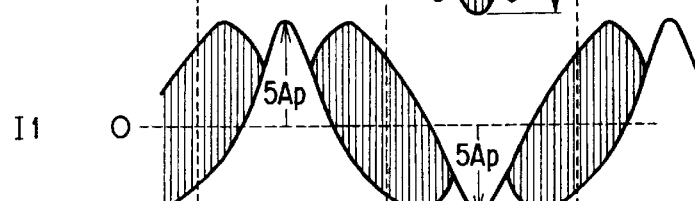
F I G. 7F  V1 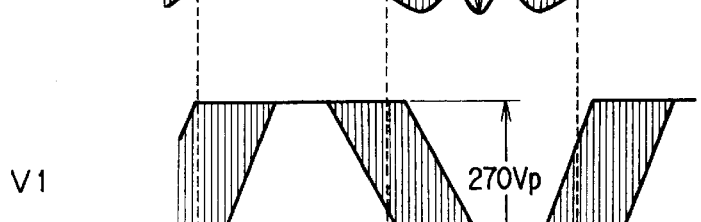
F I G 7G  Ei 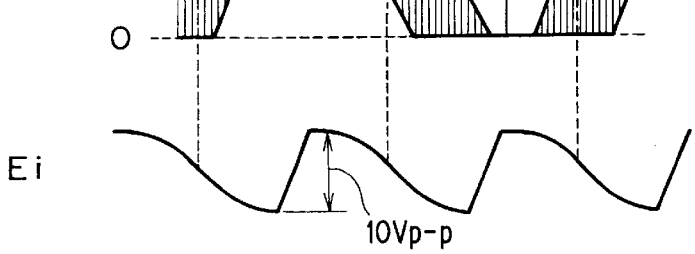

FIG. 8A  VAC 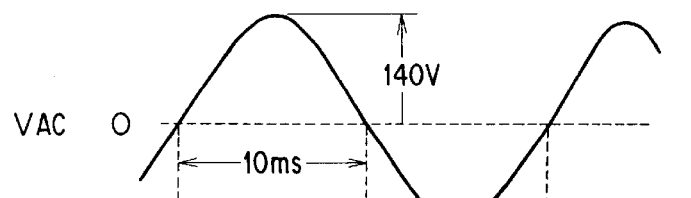
FIG. 8B  IAC 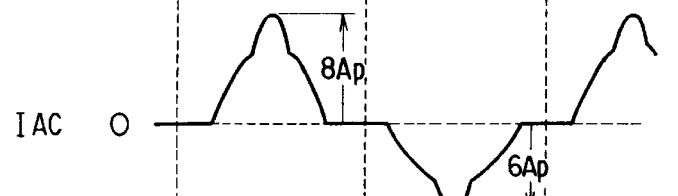
FIG. 8C  I2 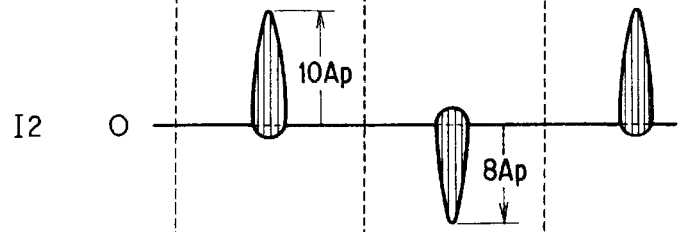
FIG. 8D  I1 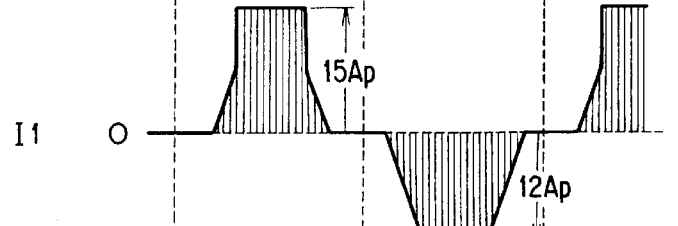
FIG. 8E  V1 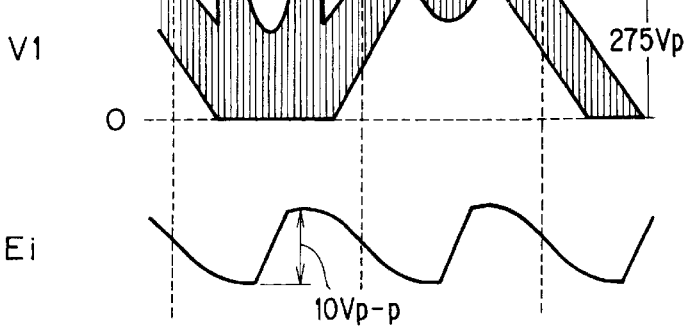
FIG. 8F  Ei 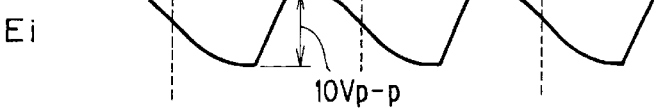

PRIOR ART
FIG. 14A    VAC 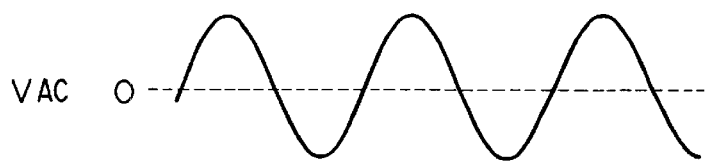
FIG. 14B    IAC 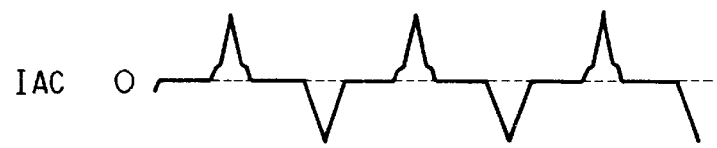
FIG. 14C    V1 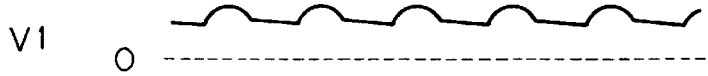
FIG. 14D    ID1 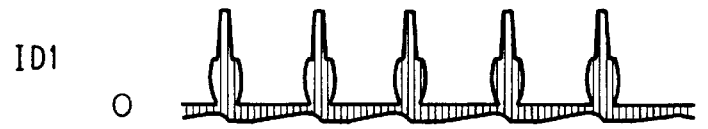
FIG. 14E    V2 
FIG. 14F    ILS 
FIG. 14G    V3 
FIG. 14H    IC3 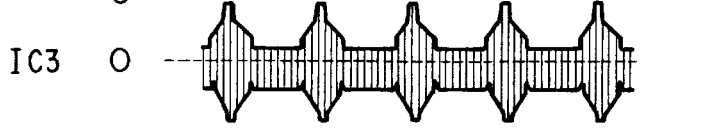
FIG. 14I    I1 
FIG. 14J    ΔE0 

SWITCHING POWER SUPPLY HAVING AN IMPROVED POWER FACTOR BY VOLTAGE FEEDBACK

BACKGROUND OF THE INVENTION

The present invention relates to a switching power supply circuit having a power factor improving function.

FIGS. 10 and 11 are circuit diagrams showing different examples of a power factor improving circuit in a switching power supply circuit. FIG. 11 shows only the section of a power factor improving circuit.

FIG. 10 shows a power factor improving circuit 20a of a capacitive coupling type using capacitor voltage division.

The power supply circuit is formed by providing a self-excited voltage resonance type switching converter with the power factor improving circuit 20a for improving the power factor.

The power supply circuit shown in the figure is provided with a bridge rectifier circuit Di for subjecting a commercial alternating-current power AC to full-wave rectification.

An output rectified by the bridge rectifier circuit Di is stored in a smoothing capacitor Ci via the power factor improving circuit 20a, whereby a rectified and smoothed voltage Ei is obtained across the smoothing capacitor Ci.

For description of the voltage resonance type converter, reference is to be made to embodiments of the present invention.

A parallel resonant capacitor Cr is connected to a collector of a switching device Q1. Capacitance of the parallel resonant capacitor Cr and leakage inductance L1 on the primary winding N1 side of an isolating converter transformer PIT form a primary-side parallel resonant circuit of the voltage resonance type converter. During the off period of the switching device Q1, a voltage across the resonant capacitor Cr practically forms a sinusoidal pulse waveform as a result of the effect of the parallel resonant circuit, and thus a voltage resonance type operation is obtained.

The power factor improving circuit 20a has a choke coil Ls and a fast recovery type diode D1 connected in series with each other and inserted between a positive output terminal of the bridge rectifier circuit Di and a positive terminal of the smoothing capacitor Ci. A filter capacitor CN is provided in parallel with the series connection circuit of the choke coil Ls and the fast recovery type diode D1, thereby forming a normal-mode low-pass filter in conjunction with the choke coil Ls.

A parallel resonant capacitor C10 is provided in parallel with the fast recovery type diode D1. The parallel resonant capacitor C10 forms a series resonant circuit in conjunction with the choke coil Ls. The series resonant circuit thereby has an effect of controlling increase in the rectified and smoothed voltage Ei at light load.

The parallel resonant capacitor Cr is connected to the power factor improving circuit 20a at a node that connects the choke coil Ls, an anode of the fast recovery type diode D1, and the parallel resonant capacitor C10 with each other, so that a switching output obtained in the primary-side parallel resonant circuit is fed back to the power factor improving circuit 20a.

Thus, with the configuration of the power factor improving circuit 20a shown in the figure, the switching output obtained in the primary-side parallel resonant circuit is fed back to the rectified current path via the capacitive coupling of the parallel resonant capacitor Cr.

Since the parallel resonant capacitor Cr is connected to the anode of the fast recovery type diode D1 in the power factor improving circuit 20a, the parallel resonant capacitor Cr and the parallel resonant capacitor C10 are in a state of being connected in series with each other. Specifically, a voltage resonance pulse voltage appearing as a voltage across the parallel resonant capacitor Cr is divided by a capacitance ratio between the parallel resonant capacitor Cr and the parallel resonant capacitor C10. The voltage is fed back to the smoothing capacitor Ci via the parallel resonant capacitor C10 connected in parallel with the fast recovery type diode D1, and thus a circuit system of a voltage feedback type is formed.

This circuit configuration divides a primary-side voltage resonance-pulse voltage Vcp=600 V, for example, into voltages in a ratio of about 3:1 by means of the primary-side parallel resonant capacitors Cr and C10, and then feeds back a high-frequency sinusoidal pulse voltage of 150 V.

At times near a positive and a negative peak of an alternating-current input voltage VAC, the fast recovery type diode D1 conducts, and the smoothing capacitor Ci is charged with a steep pulse charging current from the alternating-current input power supply AC.

At other than the times near the positive and negative peaks of the alternating-current input voltage VAC, the fast recovery type diode D1 is allowed to repeat switching operation by the pulse voltage being fed back. During the off period of the fast recovery type diode D1, a parallel resonance current caused by the parallel resonant capacitor Cr, the inductance LS, and the capacitor CN flows. During the on period of the fast recovery type diode D1, a high-frequency charging current flows from the alternating-current input power supply AC to the smoothing capacitor Ci via the inductance LS.

This operation increases the conduction angle of an alternating input current IAC, thereby making it possible to improve the power factor.

FIG. 11 shows a power factor improving circuit 20b of a diode coupling type using a tertiary winding system.

The power factor improving circuit 20b has a choke coil LS and a Schottky diode D1s connected in series with each other and inserted between the positive output terminal of the bridge rectifier circuit Di and the positive terminal of the smoothing capacitor Ci.

A filter capacitor CN is inserted in parallel with the series connection of the choke coil LS and the Schottky diode D1s, thereby forming a normal-mode low-pass filter in conjunction with the choke coil LS.

A tertiary winding N3 of an isolating converter transformer PIT is connected via a series resonant capacitor C3 to a node that connects an anode of the Schottky diode D1s and the choke coil LS with each other, whereby the switching output voltage obtained in the primary-side parallel resonant circuit is fed back to the power factor improving circuit 20b.

In this case, around peaks of the absolute value of the alternating-current input voltage VAC, the Schottky diode D1s conducts, and a charging current I1 flows from the alternating-current input power supply AC to the smoothing capacitor Ci via the choke coil LS and the Schottky diode D1s. At the same time, a voltage resonance pulse voltage of the tertiary winding N3 is fed back to a series circuit of the series resonant capacitor C3 and the Schottky diode D1s for switching operation of the Schottky diode D1s. Thereby, a flowing range of the alternating input current IAC is extended, and thus the power factor is improved.

When the absolute value of the alternating-current input voltage VAC is lowered, the Schottky diode D1s becomes nonconductive, and the voltage resonance pulse voltage of the tertiary winding N3 is turned into a series resonance voltage by a series circuit of the series resonant capacitor C3, the choke coil LS, and the filter capacitor CN.

The two circuit examples are shown above, and the configuration of FIG. 11 has the higher AC/DC power conversion efficiency ηAC/DC. Characteristics of the AC/DC power conversion efficiency ηAC/DC and the power factor PF in this case are shown in FIGS. 12 and 13.

FIG. 12 shows characteristics of the power factor PF and the AC/DC power conversion efficiency ηAC/DC when the load power Po is varied from 40 W to 200 W. FIG. 13 shows characteristics of variations in the power factor PF and the AC/DC power conversion efficiency ηAC/DC when the alternating-current input voltage VAC is varied from 80 V to 260 V.

As is understood from the figures, it is possible to maintain a power factor PF of 0.7 or more and achieve an AC/DC power conversion efficiency ηAC/DC of 90% or more over wide ranges of the load power and the alternating-current input voltage.

However, a switching power supply circuit having the prior art power factor improving circuit 20a or 20b as described above has the following problems.

First, increase of the amount of voltage feedback to the power factor improving circuit 20 in a state of a maximum load power for improvement of the power factor to 0.8 or more extends a load power region and an alternating-current input voltage region where zero volt switching operation, a condition for stable operation of the primary-side voltage resonance converter, cannot be performed. Therefore, the power factor cannot be improved to 0.8 or more.

FIGS. 14A to 14J show operating waveforms of parts of the circuit example shown in FIG. 11.

Around the positive and negative peaks of the alternating-current input voltage VAC, a series resonance current IC3 of the tertiary winding N3 and the series resonant capacitor C3 is superimposed on a current ID1 flowing from the inductance Ls and the Schottky diode D1s. Thus, an excessive charging current as shown in FIG. 14I flows as a current I1 to the smoothing capacitor Ci.

Therefore, increase of the number of turns of the tertiary winding N3 for a larger amount of voltage feedback for improvement of the power factor PF narrows a load power region and an alternating-current input voltage region where zero volt switching operation, a condition for stable operation of the switching device Q1 of the primary-side voltage resonance converter, can be performed. This renders the zero volt switching operation unstable with variation in the load power Po and the alternating-current input voltage VAC. Thus, the power factor cannot be improved to 0.8 or more.

In addition, the AC/DC power conversion efficiency ηAC/DC cannot be increased further in the state of the maximum load power.

SUMMARY OF THE INVENTION

An object of the present invention is to provide a switching power supply circuit having a power factor improving function, which is capable of performing a zero volt switching operation without narrowing the range thereof even when the power factor is improved.

To achieve the above object, according to the present invention, there is provided a switching power supply circuit, including: a smoothing means having two smoothing capacitors connected in series with each other for smoothing a rectified current and thereby outputting a double direct-current input voltage; an isolating converter transformer for transmitting an output on a primary side thereof to a secondary side thereof, the isolating converter transformer including a gap formed so as to provide loose coupling at a desired coupling coefficient; a switching means including a switching device for interrupting the double direct-current input voltage and outputting the interrupted voltage to a primary winding of the isolating converter transformer; a primary-side resonant circuit formed by at least a leakage inductance component of the primary winding of the isolating converter transformer and capacitance of a primary-side parallel resonant capacitor for converting operation of the switching means into voltage resonance type operation; a power factor improving rectifier means for rectifying an alternating-current power and thereby supplying the rectified current to the smoothing means and for improving a power factor by interrupting the rectified current according to a switching output voltage obtained in the primary-side resonant circuit and fed back to the power factor improving rectifier means via a series resonant capacitor and a tertiary winding formed by winding a wire of the primary winding of the isolating converter transformer; a secondary-side resonant circuit formed on the secondary side by a leakage inductance component of a secondary winding of the isolating converter transformer and capacitance of a secondary-side resonant capacitor; a direct-current output voltage generating means for rectifying an input alternating voltage obtained in the secondary winding of the isolating converter transformer and thereby generating a secondary-side direct-current output voltage, the direct-current output voltage generating means including the secondary-side resonant circuit; and a constant-voltage control means for effecting constant-voltage control of the secondary-side direct-current output voltage according to level of the secondary-side direct-current output voltage.

The power factor improving rectifier means has a first rectifier circuit formed by two fast recovery type diodes connected in series with each other and a second rectifier circuit formed by two slow recovery type diodes connected in series with each other. The tertiary winding is connected via the series resonant capacitor to a node that connects the two fast recovery type diodes with each other, whereby the switching output voltage is fed back to the power factor improving rectifier means. Each of the two fast recovery type diodes interrupts the rectified current according to the fed-back switching output voltage, whereby the power factor is improved.

Alternatively, the power factor improving rectifier means may have a rectifier circuit formed by two fast recovery type diodes connected in series with each other. The tertiary winding is connected via the series resonant capacitor to a node that connects the two fast recovery type diodes with each other, whereby the switching output voltage is fed back to the power factor improving rectifier means. Each of the two fast recovery type diodes interrupts the rectified current according to the fed-back switching output voltage, whereby the power factor is improved.

With this configuration, the voltage resonance pulse voltage generated in the primary-side voltage resonance converter is fed back to the power factor improving rectifier means via the tertiary winding and the series resonant capacitor by magnetic coupling. Thereby, the flowing range of the alternating input current IAC is extended, and thus the power factor can be improved to about 0.9, for example.

In addition, by subjecting the alternating-current input to voltage doubler rectifier operation, it is possible to improve AC/DC conversion efficiency and reduce a ripple component of the direct-current output voltage. Also, the first rectifier circuit and the second rectifier circuit shunt the current to be stored in the smoothing means. Thus, it is possible to secure a zero volt switching operation range even when the power factor is improved.

BRIEF DESCRIPTION OF THE DRAWINGS

FIGS. 5A and 5B are diagrams of assistance in explaining characteristics of a power factor and AC/DC conversion efficiency in a switching power supply circuit according to an embodiment of the present invention;

FIGS. 7A to 7G are waveform diagrams showing operation of the switching power supply circuit according to the first embodiment of the present invention;

FIGS. 8A to 8F are waveform diagrams showing operation of the switching power supply circuit according to the second embodiment of the present invention;

FIGS. 14A to 14J are waveform diagrams showing operation of the prior art switching power supply circuit.

DETAILED DESCRIPTION OF THE INVENTION

Figure 1:
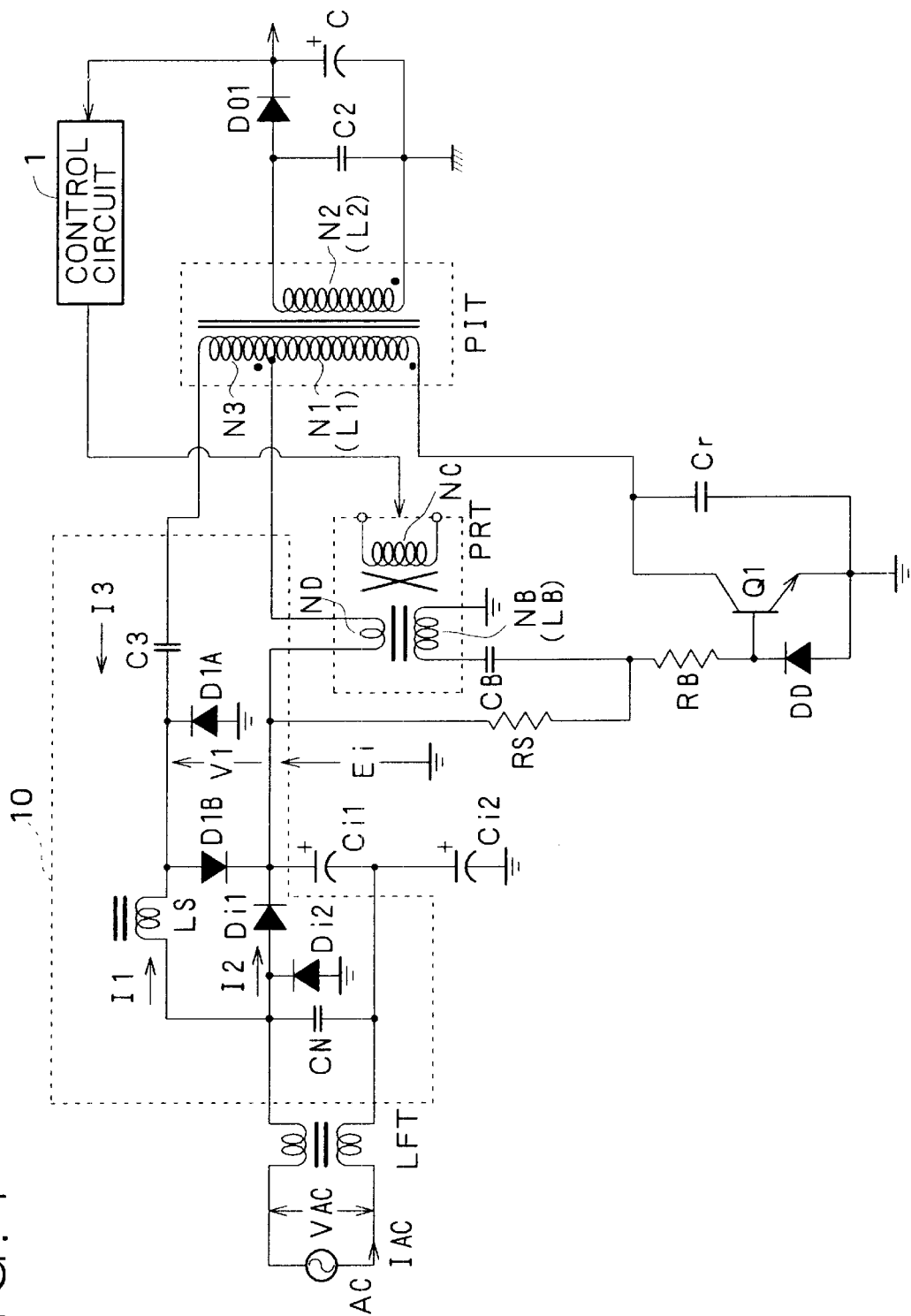
FIG. 1 is a circuit diagram of a switching power supply circuit according to a first embodiment of the present invention.
Figure 2:
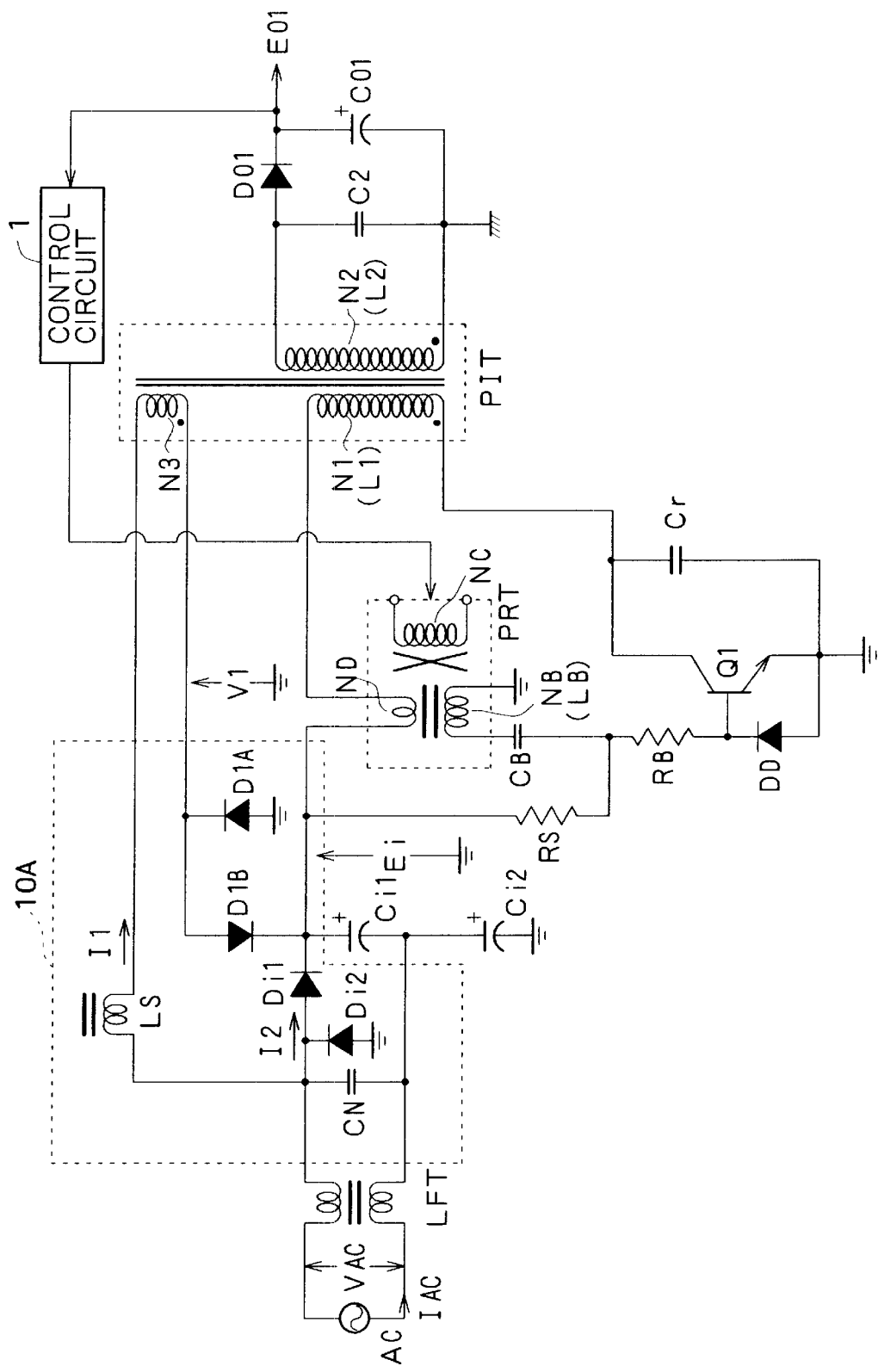
FIG. 2 is a circuit diagram of a switching power supply circuit according to a second embodiment of the present invention.

FIG. 1 is a circuit configuration diagram of a switching power supply circuit according to an embodiment of the present invention, and FIG. 2 is a circuit configuration diagram of a switching power supply circuit according to a second embodiment of the present invention.

The power supply circuits shown in the figures are provided on the primary side with a voltage resonance type switching converter. The voltage resonance type converter is provided with a rectifier circuit having a power factor improving function, that is, a power factor improving rectifier circuit 10.

The circuits in these examples are suitable for use in a case where an alternating-current input voltage VAC is about 100 V and a load power Po of 200 W or more is required.

The power supply circuits shown in the figures have a line filter transformer LFT for a commercial alternating-current power supply AC.

An alternating input current IAC is rectified by the power factor improving rectifier circuit 10, and smoothed by a pair of smoothing capacitors Ci1 and Ci2 connected in series with each other, whereby the voltage doubler rectifier system provides a rectified and smoothed voltage Ei twice that of a full-wave rectifier system.

Configuration of the voltage resonance type converter will first be described.

The voltage resonance type converter in the examples is self-excited, and provided with a switching device Q1. In this case, a high voltage bipolar transistor (Bipolar Junction Transistor) is employed as the switching device Q1, and has a withstand voltage of about 1500 V, for example.

A base of the switching device Q1 is connected to a positive electrode side of the smoothing capacitor Ci1 via a base current limiting resistance RB and a starting resistance RS, so that base current at the start of power supply is taken from a rectifying and smoothing line. Connected between the base of the switching device Q1 and a primary-side ground is a resonant circuit for self-oscillation driving that is formed by connecting a driving winding NB, a resonant capacitor CB, and the base current limiting resistance RB in series with each other.

A clamp diode DD inserted between the base of the switching device Q1 and a negative electrode of the smoothing capacitor Ci2 forms a path of clamp current that flows during the off period of the switching device Q1.

A collector of the switching device Q1 is connected to the positive terminal of the smoothing capacitor Ci1 via a series connection of a primary winding N1 and a detecting winding ND. An emitter of the switching device Q1 is connected to a ground on the primary side.

A parallel resonant capacitor Cr is connected to the collector and emitter of the switching device Q1. Capacitance of the parallel resonant capacitor Cr and leakage inductance L1 on the primary winding N1 side of an isolating converter transformer PIT, which will be described later, form a primary-side parallel resonant circuit of the voltage resonance type converter. During the off period of the switching device Q1, a voltage across the resonant capacitor Cr practically forms a sinusoidal pulse waveform as a result of the effect of the parallel resonant circuit, and thus a voltage resonance type operation is obtained.

An orthogonal type control transformer PRT shown in the figures is a saturable reactor provided with the detecting winding ND, the driving winding NB, and a control winding NC. The orthogonal type transformer PRT is provided to drive the switching device Q1 and effect control for constant voltage.

The structure of the orthogonal type control transformer PRT is a cubic core formed by connecting two double-U-shaped cores each having four magnetic legs with each other at ends of the magnetic legs. The detecting winding ND and the driving winding NB are wound around two given magnetic legs of the cubic core in the same winding direction, and the control winding NC is wound in a direction orthogonal to the detecting winding ND and the driving winding NB.

In this case, the detecting winding ND of the orthogonal type control transformer PRT, which is a frequency changing means, is connected in series with the primary winding N1 of the isolating converter transformer PIT, so that the switching output of the switching device Q1 is transmitted to the detecting winding ND via the primary winding N1.

The switching output obtained by the detecting winding ND of the orthogonal type control transformer PRT is induced in the driving winding NB via transformer coupling, whereby an alternating voltage is generated as driving voltage in the driving winding NB. The driving voltage is outputted as driving current from a series resonant circuit NB and CB, which forms the self-oscillation driving circuit, to the base of the switching device Q1 via the base current limiting resistance RB. Thus, the switching device Q1 performs switching operation at a switching frequency determined by the resonance frequency of the series resonant circuit NB and CB.

Figure 3:
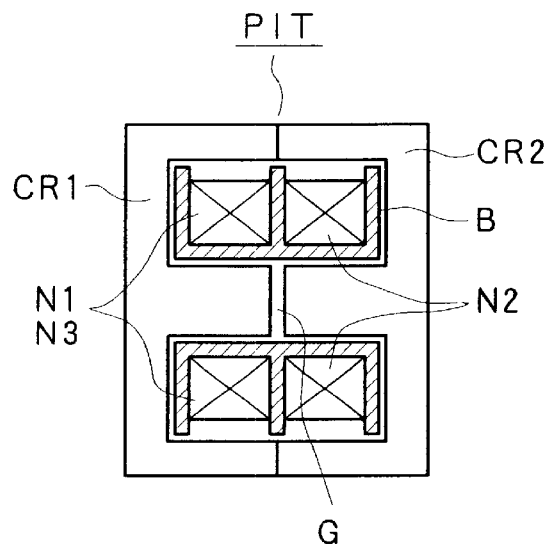
FIG. 3 is a sectional side view of an isolating converter transformer employed in the power supply circuits according to the embodiments.

As shown in FIG. 3, the isolating converter transformer PIT has an E—E-shaped core formed by combining E-shaped cores CR1 and CR2 made for example of a ferrite material in such a manner that magnetic legs of the core CR1 are opposed to magnetic legs of the core CR2. The primary winding N1 and a secondary winding N2 are wound around a central magnetic leg of the E—E-shaped core in a state of being divided from each other by a dividing bobbin B. Also, a gap G is formed in the central magnetic leg, as shown in FIG. 3. Thus, a desired coupling coefficient k of 0.85 for example, that is, loose coupling is provided between the primary winding N1 and the secondary winding N2, and thereby a saturated state is not readily obtained.

A tertiary winding N3 is formed by winding a wire of the primary winding N1, as shown in FIG. 1, or is wound around the same bobbin as the primary winding N1, as shown in FIG. 2, so that a coupling coefficient k of 0.95 for example, that is, close coupling is obtained between the primary winding N1 and the tertiary winding N3.

The gap G can be formed by making the central magnetic leg of each of the E-shaped cores CR1 and CR2 shorter than two outer magnetic legs of each of the E-shaped cores CR1 and CR2.

An end of the primary winding N1 is connected to the collector of the switching device Q1, whereas the other end of the primary winding N1 is connected to the positive electrode of the smoothing capacitor Ci1 via the detecting winding ND, which is connected in series with the positive electrode of the smoothing capacitor Ci1.

The tertiary winding N3 formed by winding the wire of the primary winding N1 functions as a feedback winding, and is connected via a series resonant capacitor C3 to a node that connects fast recovery type diodes D1A and D1B with each other in the power factor improving rectifier circuit 10.

An alternating voltage induced by the primary winding N1 is generated in the secondary winding N2 on the secondary side of the isolating converter transformer PIT. In this case, a secondary-side parallel resonant capacitor C2 is connected in parallel with the secondary winding N2. Thereby, leakage inductance L2 of the secondary winding N2 and capacitance of the secondary-side parallel resonant capacitor C2 form a parallel resonant circuit. The parallel resonant circuit converts the alternating voltage induced in the secondary winding N2 into a resonance voltage. Thus, a voltage resonance operation is obtained on the secondary side.

Thus, the power supply circuit is provided with the parallel resonant circuit to convert switching operation into voltage resonance type operation on the primary side and also the parallel resonant circuit to provide voltage resonance operation on the secondary side. Therefore, the power supply circuit is formed as what is referred to in the present specification as a complex resonance type switching converter.

In this case, a rectifier diode D01 and a smoothing capacitor C01 are connected to the parallel resonant circuit on the secondary side in a manner as shown in the figures, thereby providing a half-wave rectifier circuit to generate a direct-current output voltage E01.

The direct-current output voltage E01 is also inputted from a branch point to a control circuit 1. The control circuit 1 controls resonance frequency for switching the switching device Q1 using the direct-current output voltage E01 as a detection voltage, and thereby effects control for constant voltage.

More specifically, the control circuit 1 for example supplies a direct current whose level is changed according to level of the secondary-side direct-current output voltage E01 to the control winding NC of the drive transformer PRT as a control current, and thereby effects control for constant voltage as described later.

Mutual inductance M between the inductance L1 of the primary winding N1 and the inductance L2 of the secondary winding N2 in the isolating converter transformer PIT becomes +M or −M, depending on a relation between the winding direction of the primary winding N1 and the secondary winding N2 and the connection of the rectifier diode D01.

Figure 4A:
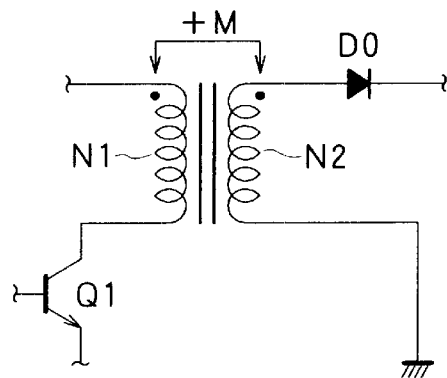
FIGS. 4A and 4B are diagrams of assistance in explaining operations when mutual inductance is +M and –M.
Figure 4B:
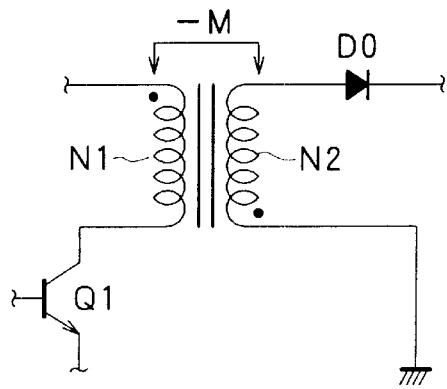

For example, a connection shown in FIG. 4A has a mutual inductance of +M (additive polarity), while a connection shown in FIG. 4B has a mutual inductance of −M (subtractive polarity).

This will be applied to the secondary-side operation of the power supply circuit shown in FIG. 1. When the alternating voltage obtained at the secondary winding N2 has a positive polarity, for example, an operation that causes rectified current to flow in the rectifier diode D01 can be considered a +M operation mode.

The control circuit 1 variably controls the inductance LB of the driving winding NB wound in the orthogonal type control transformer PRT by changing the level of a control current flowing through the control winding NC according to change in the level of the secondary-side direct-current output voltage E01. This results in a change in resonance conditions of the series resonant circuit including the inductance LB of the driving winding NB in the circuit for self-oscillation driving of the switching device Q1. This represents an operation of changing the switching frequency of the switching device Q1, by which the secondary-side direct-current output voltage is stabilized.

When changing the switching frequency of the switching device Q1, the circuit shown in FIG. 1 fixes the off period of the switching device Q1, and variably controls the on period of the switching device Q1. Specifically, it may be considered that by variably controlling the switching frequency of the switching device as an operation for constant-voltage control, the power supply circuit controls resonance impedance for switching output, and at the same time, effects PWM control of the switching device within a switching cycle. This complex control operation is realized by a single control circuit system.

In switching frequency control, the power supply circuit increases the switching frequency when the secondary-side output voltage is raised with decreasing load, for example, and thus controls the secondary-side output.

Configuration of the power factor improving rectifier circuit 10 in FIG. 1 will be described.

The power factor improving rectifier circuit 10 has an effect of rectifying the alternating input current IAC and an effect of improving its power factor.

The alternating input is supplied to the two fast recovery type diodes D1A and D1B via inductance Ls of a choke coil.

The fast recovery type diodes D1A and D1B are connected in series with each other between the positive terminal of the smoothing capacitor Ci1 and the primary-side ground, and thereby function as a first voltage doubler rectifier circuit. The tertiary winding of the isolating converter transformer PIT is connected via the series resonant capacitor C3 to a node that connects the fast recovery type diodes D1A and D1B with each other.

A film capacitor is used as the series resonant capacitor C3.

In addition, the alternating-current line is provided with a series circuit of slow recovery type diodes Di1 and Di2 disposed between the positive terminal of the smoothing capacitor Ci1 and the primary-side ground, and thereby the series circuit functions as a second voltage doubler rectifier circuit.

Specifically, during a positive period of the alternating-current input voltage VAC, a current to be rectified flows through a path from the alternating-current power supply AC through the line filter transformer LFT, the inductance Ls, and the fast recovery type diode D1B to the smoothing capacitor Ci1 to be thereby stored in the smoothing capacitor Ci1, and at the same time, a current to be rectified flows through a path from the alternating-current power supply AC through the line filter transformer LFT and the slow recovery type diode Di1 to the smoothing capacitor Ci1 to be thereby stored in the smoothing capacitor Ci1.

During a negative period of the alternating-current input voltage VAC, a current to be rectified flows through a path from the alternating-current power supply AC through the line filter transformer LFT, the smoothing capacitor Ci2, the primary-side ground, and the fast recovery type diode D1A to the choke coil to be thereby stored in the smoothing capacitor Ci2, and at the same time, a current to be rectified flows through a path from the alternating-current power supply AC through the line filter transformer LFT, the smoothing capacitor Ci2, and the primary-side ground to the slow recovery type diode Di2 to be thereby stored in the smoothing capacitor Ci2.

Thus, the two rectifier circuits divide the current to be rectified into two currents and then supply the currents to the smoothing capacitor Ci1 or Ci2.

The smoothing capacitors Ci1 and Ci2 being connected in series with each other, a rectified and smoothed voltage Ei is extracted from the positive terminal side of the smoothing capacitor Ci1.

The power factor improving function of the power factor improving rectifier circuit 10 is as follows.

A switching output obtained in the primary-side parallel resonant circuit is fed back to the pair of fast recovery type diodes D1A and D1B via the tertiary winding N3 and the series resonant capacitor C3 by magnetic coupling.

As a result of the switching output thus fed back, an alternating voltage having a switching cycle is superimposed in the current rectifying path. The component of the superimposed alternating voltage having the switching cycle causes the fast recovery type diode D1A or D1B to interrupt the current to be rectified in the switching cycle. This interrupting effect also increases apparent inductance Ls.

Thus, even in a period when level of rectified output voltage is lower than voltage across the smoothing capacitor Ci1 or Ci2, a charging current flows to the smoothing capacitor Ci1 or Ci2.

As a result, the flowing range of the alternating input current IAC is extended, which results in an improvement in the power factor.

The tertiary winding N3 of the isolating converter transformer PIT is connected to a cathode of the fast recovery type diode D1A via the series resonant capacitor C3, thereby forming a voltage feedback circuit for feeding back a voltage resonance pulse voltage, or the switching output obtained in the primary-side parallel resonant circuit to a node connecting the fast recovery type diodes D1A and D1B and the choke coil LS with one another.

Specifically, the voltage across the tertiary winding N3 is a negative pulse voltage, and this pulse voltage causes current resonance by the capacitance of the series resonant capacitor C3 and the inductance Ls to generate a voltage in the choke coil Ls. The voltage in the choke coil Ls is fed back to the smoothing capacitors Ci1 and Ci2.

The voltage resonance pulse voltage generated during the off period of the switching device Q1 is positive on the side of the smoothing capacitors Ci1 and Ci2, and therefore even when the alternating-current input voltage VAC is lower than the voltage Ei obtained from the smoothing capacitors Ci1 and Ci2, the alternating input current IAC from the alternating-current power supply AC is stored in the smoothing capacitors Ci1 and Ci2 if a value obtained by adding the pulse voltage of the tertiary winding N3 to the alternating-current input voltage VAC is higher than the voltage Ei.

As a result, the conduction angle of the alternating input current IAC is increased, and thereby the power factor PF is improved.

Exciting energy released by the tertiary winding N3 is a changed form of charging energy for the smoothing capacitors Ci1 and Ci2. The exciting energy is changed into charging current to charge the smoothing capacitors Ci1 and Ci2, thus returning to charging energy.

The two rectifier paths shunt the current to be stored in the smoothing capacitors Ci1 and Ci2.

This prevents an excessive charging current from flowing through the inductance Ls and the fast recovery type diode D1B or D1A around a positive and a negative peak of the alternating-current input voltage VAC. Thus, it is possible to prevent limitations in zero volt switching operation around the peak values of the alternating-current input voltage VAC.

Thus, conditions for stable zero volt switching operation over the entire range against variation in load power Po and the alternating-current input voltage VAC are satisfied even when the number of turns of the tertiary winding N3 is increased for a larger amount of voltage feedback.

It is therefore no problem to increase the amount of voltage feedback and improve the power factor to 0.8 or more, for example.

Configuration of a power factor improving rectifier circuit 10A in FIG. 2 will be described.

A choke coil having an inductance Ls is connected in series with the alternating-current line, and one end of the tertiary winding N3 of the isolating converter transformer PIT is connected to the inductance Ls. The other end of the tertiary winding N3 is connected to a node that connects fast recovery type diodes D1A and D1B in series with each other between the positive terminal of the smoothing capacitor Ci1 and the primary-side ground. The fast recovery type diodes D1A and D1B thereby function as a first voltage doubler rectifier circuit.

In addition, the alternating-current line is connected to a node that connects slow recovery type diodes Di1 and Di2 in series with each other. The series circuit of the slow recovery type diodes Di1 and Di2 is disposed between the positive terminal of the smoothing capacitor Ci1 and the primary-side ground, and thereby functions as a second voltage doubler rectifier circuit.

Specifically, during a positive period of the alternating-current input voltage VAC, a current to be rectified flows through a path from the alternating-current power supply AC through the line filter transformer LFT, the inductance Ls, the tertiary winding N3, and the fast recovery type diode D1B to the smoothing capacitor Ci1 to be thereby stored in the smoothing capacitor Ci1, and at the same time, a current to be rectified flows through a path from the alternating-current power supply AC through the line filter transformer LFT and the slow recovery type diode Di1 to the smoothing capacitor Ci1 to be thereby stored in the smoothing capacitor Ci1.

During a negative period of the alternating-current input voltage VAC, a current to be rectified flows through a path from the alternating-current power supply AC through the line filter transformer LFT, the smoothing capacitor Ci2, and the primary-side ground to the fast recovery type diode D1A to be thereby stored in the smoothing capacitor Ci2, and at the same time, a current to be rectified flows through a path from the alternating-current power supply AC through the line filter transformer LFT, the smoothing capacitor Ci2, and the primary-side ground to the slow recovery type diode Di2 to be thereby stored in the smoothing capacitor Ci2.

Thus, as in the power supply circuit shown in FIG. 1, the two rectifier circuits shunt the current to be rectified to the two systems and then supply the current to the smoothing capacitors Ci1 and Ci2.

The smoothing capacitors Ci1 and Ci2 being connected in series with each other, a rectified and smoothed voltage Ei is extracted from the positive terminal side of the smoothing capacitor Ci1.

The power factor improving rectifier circuit 10A improves the power factor in the same manner as the power factor improving rectifier circuit 10.

In this case, the resonant capacitor is not provided in the power factor improving rectifier circuit 10A, and therefore the current values of switching currents I1 and I2 and the alternating input current IAC for positive polarity of the alternating-current input voltage VAC do not balance those for negative polarity of the alternating-current input voltage VAC. This results from an imbalance between the positive pulse voltage and the negative pulse voltage of the tertiary winding N3. When the polarity of the tertiary winding N3 is reversed, the peak values of the switching currents I1 and I2 and the alternating input current IAC are also reversed.

In addition, as in the power factor improving rectifier circuit 10 of the power supply circuit shown in FIG. 1, the two paths in the power factor improving rectifier circuit 10A shunt the current to be stored in the smoothing capacitors Ci1 and Ci2. This prevents an excessive charging current from flowing through the inductance Ls and the fast recovery type diode D1B or D1A around a positive and a negative peak of the alternating-current input voltage VAC. Thus, it is possible to prevent limitations in zero volt switching operation around the peak values of the alternating-current input voltage VAC.

FIGS. 5A and 5B and FIGS. 7A to 7G show experimental results and operating waveforms, respectively, of the switching power supply circuit of FIG. 1. FIGS. 6A and 6B and FIGS. 8A to 8F show experimental results and operating waveforms, respectively, of the switching power supply circuit of FIG. 2.

FIG. 5A shows characteristics of variations in the power factor PF and AC/DC power conversion efficiency ηAC/DC when the alternating-current input voltage VAC of the power supply circuit shown in FIG. 1 is 100 V and its load power Po is varied from 40 W to 200 W. FIG. 5B shows characteristics of variations in the power factor PF and AC/DC power conversion efficiency ηAC/DC when the load power Po is 200 W and the alternating-current input voltage VAC is varied from 80 V to 140 V.

Figure 6A:
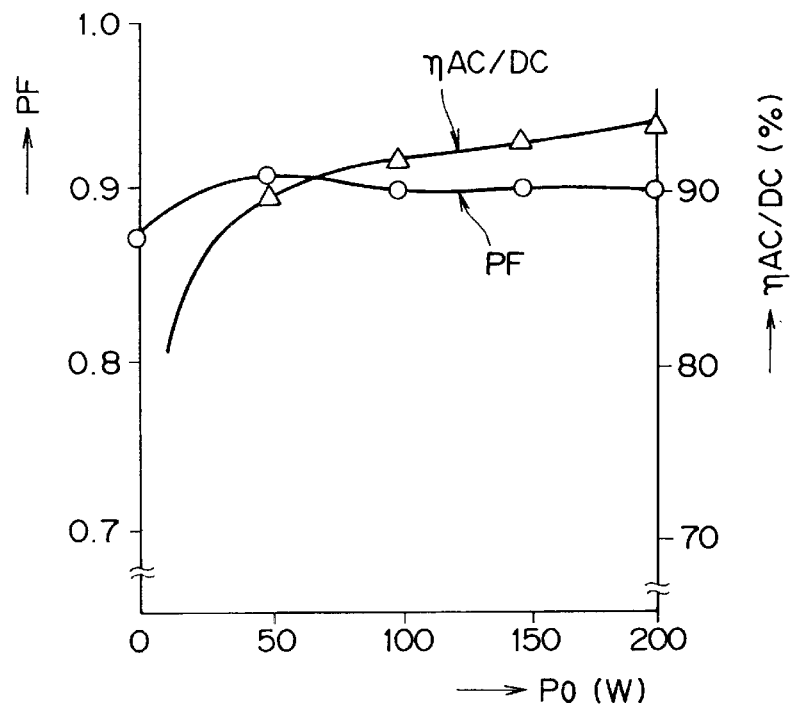
FIGS. 6A and 6B are diagrams of assistance in explaining characteristics of a power factor and AC/DC conversion efficiency in a switching power supply circuit according to an embodiment of the present invention.
Figure 6B:
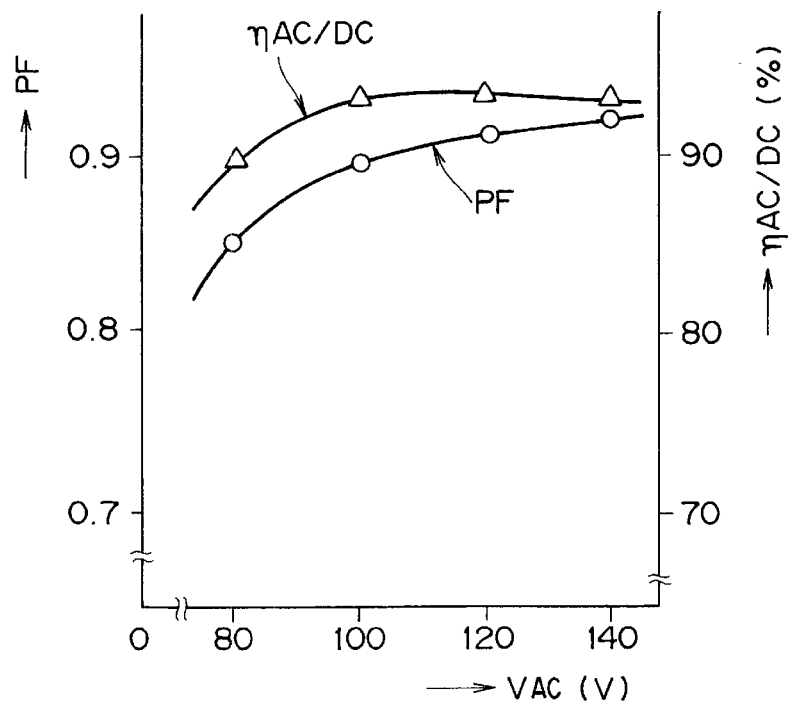

FIG. 6A shows characteristics of variations in the power factor PF and AC/DC power conversion efficiency ηAC/DC when the alternating-current input voltage VAC of the power supply circuit shown in FIG. 2 is 100 V and its load power Po is varied from 40 W to 200 W. FIG. 6B shows characteristics of variations in the power factor PF and AC/DC power conversion efficiency ηAC/DC when the load power Po is 200 W and the alternating-current input voltage VAC is varied from 80 V to 140 V.

As is understood from FIGS. 5A and 5B and FIGS. 6A and 6B, the power factor PF can be improved to 0.9 or more, and also the AC/DC power conversion efficiency ηAC/DC can be improved.

Figure 12:
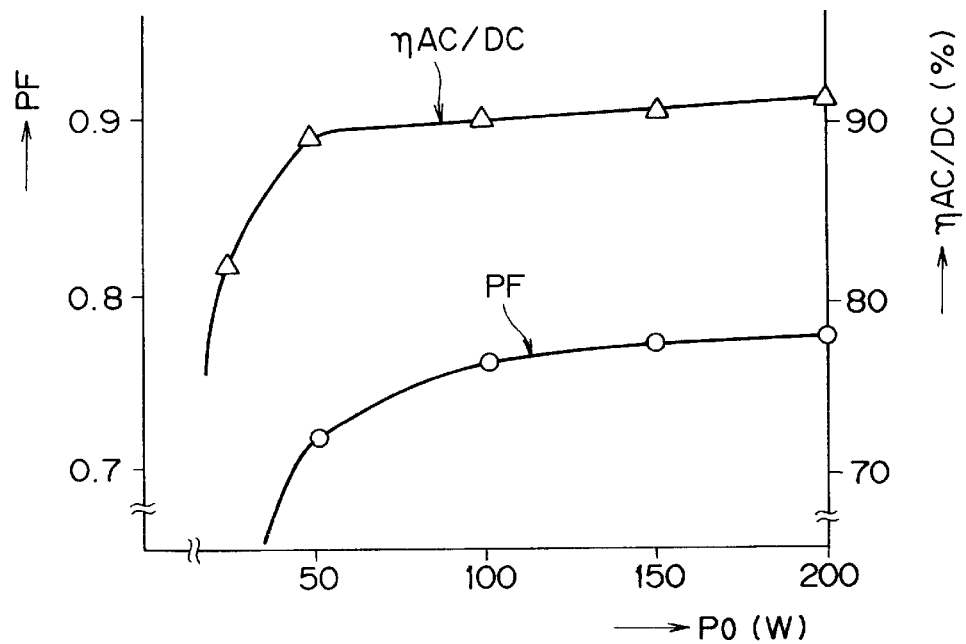
FIG. 12 is a diagram of assistance in explaining characteristics of a power factor and AC/DC conversion efficiency in the prior art switching power supply circuit.
Figure 13:
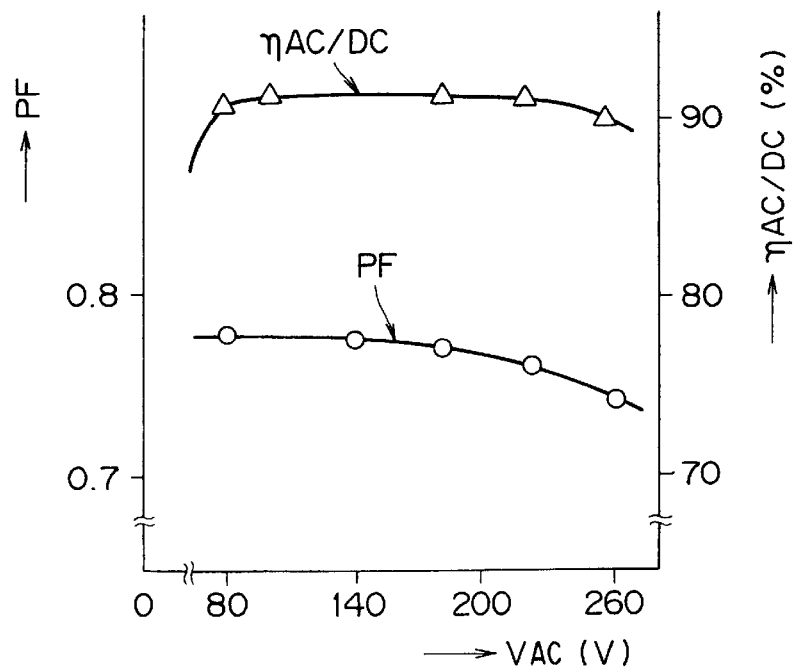
FIG. 13 is a diagram of assistance in explaining characteristics of a power factor and AC/DC conversion efficiency in the prior art switching power supply circuit.

Thus, in this case, the rectified and smoothed voltage Ei twice that of a full-wave rectifier system is obtained from the alternating-current input voltage VAC by the voltage doubler rectifier system. The primary current flowing through the primary winding N1 of the isolating converter transformer PIT is accordingly reduced to ½ of that of the conventional example. Therefore, the AC/DC power conversion efficiency ηAC/DC of the power supply circuit shown in FIG. 1 is improved from 91.8% of the conventional circuit example as shown in FIG. 12 to 93.0%, and the AC/DC power conversion efficiency ηAC/DC of the power supply circuit shown in FIG. 2 is improved to 93.7%. Thus, the input power of the power supply circuit shown in FIG. 1 is reduced by about 2.8 W, and the input power of the power supply circuit shown in FIG. 2 is reduced by about 5.2 W.

Of course, the power factor PF and the AC/DC power conversion efficiency ηAC/DC can be maintained at certain levels over wide varying ranges of the load power Po and the alternating-current input voltage VAC.

FIGS. 7A to 7G and FIGS. 8A to 8F show operating waveforms of parts of the power supply circuit of FIG. 1 and those of the power supply circuit of FIG. 2, respectively, when the load power Po is 200 W and the alternating-current input voltage VAC is 100 V at 50 Hz.

Figure 10:
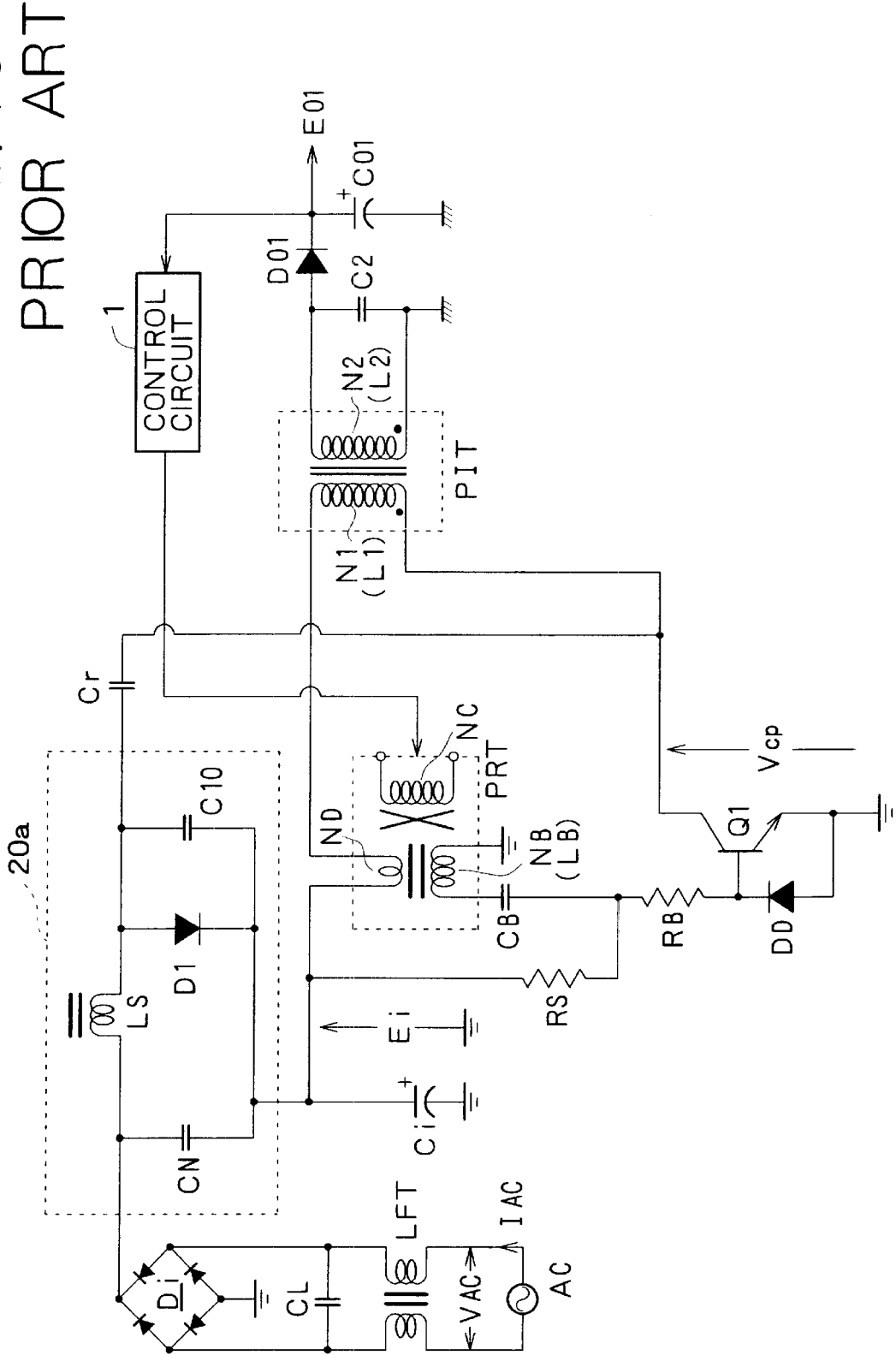
FIG. 10 is a circuit diagram showing a configuration of a prior art power supply circuit.
Figure 11:
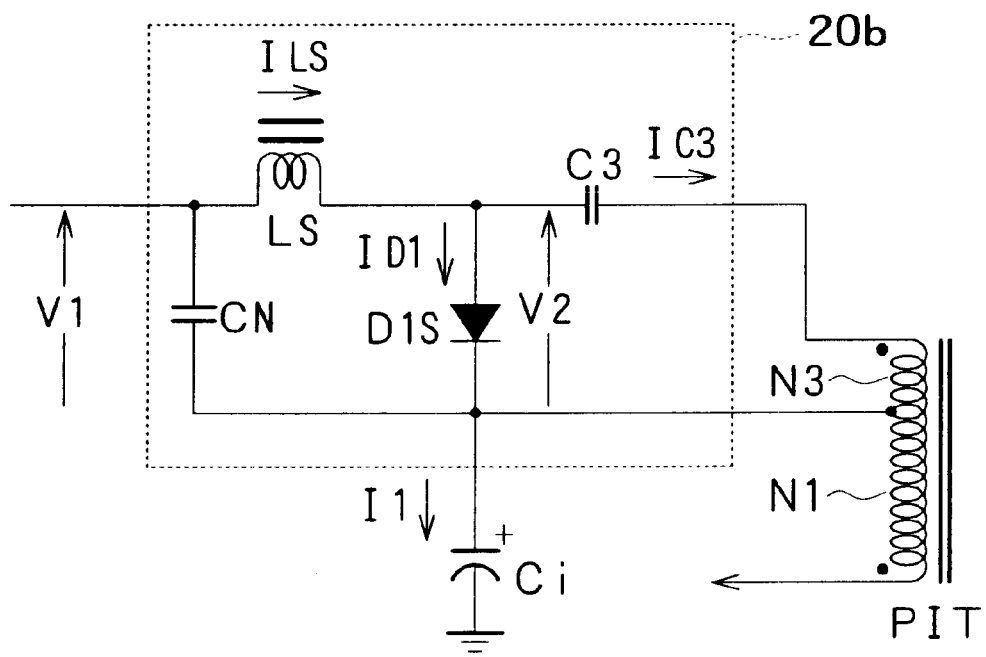
FIG. 11 is a circuit diagram showing a configuration of a prior art power factor improving circuit.

FIGS. 7C and 7E show a current I2 flowing through the second rectifier circuit and a current I1 flowing through the first rectifier circuit, respectively. Around the peak values of the alternating-current input voltage VAC, a current of 10 Ap, for example, flows in the prior art power supply circuit shown in FIG. 10. In the present embodiment, the current is divided into a low-frequency current of 5 Ap as the current I2 and a high-frequency current of 5 Ap as the current I1.

This means that the currents flowing through the slow recovery type diodes Di1 and Di2 and the currents flowing through the fast recovery type diodes D1A and D1B will not become excessive.

In addition, as is shown by a current I3 in FIG. 7D, even in a period when the alternating-current input voltage VAC is somewhat lowered from the peak value, the current I3 superimposed by the alternating voltage generated in the tertiary winding N3 switches the fast recovery type diodes D1A and D1B, whereby the power factor is improved.

FIGS. 7C and 8C show the current I2 flowing through the second rectifier circuit.

Around the peak values of the alternating-current input voltage VAC, the slow recovery type diode Di1 or Di2 conducts, and thereby the current I2 flows from the alternating current input to the smoothing capacitor Ci1 or Ci2.

FIGS. 7D and 8D show the current I3 superimposed in the first rectifier circuit by the alternating voltage generated in the tertiary winding N3. Switching is performed by the superimposed current I3, whereby the waveform of the alternating input current IAC is expanded as shown in FIGS. 7B and 8B. This results in an improvement in the power factor.

Moreover, in the present embodiment, since the input current is divided into a low-frequency current and a high-frequency current and therefore the currents flowing through the fast recovery type diodes D1A and D1B do not become excessive, zero volt switching operation is not limited around the peak values of the alternating-current input voltage VAC. Accordingly, the number of turns of the tertiary winding N3 can be increased from 2 T to 6 T, for example, for a larger amount of voltage feedback to thereby improve the power factor to 0.9 or more.

Furthermore, the slow recovery type diodes Di1 and Di2 and the fast recovery type diodes D1A and D1B can reduce generation of heat due to great current. This eliminates the need for radiators. Also, diodes having small current capacity may be selected.

Figure 9:
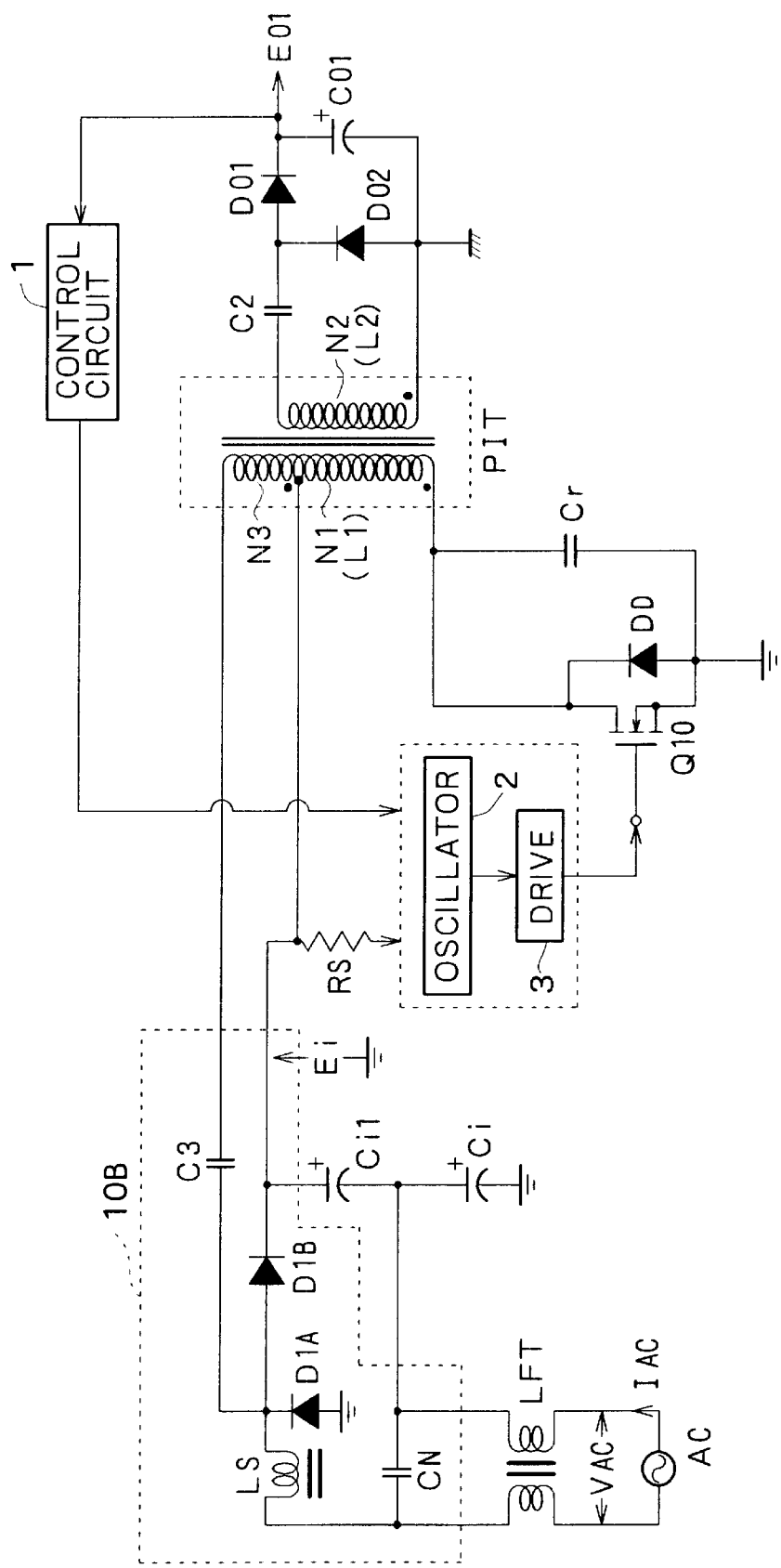
FIG. 9 is a circuit diagram of a switching power supply circuit according to a third embodiment of the present invention.

FIG. 9 shows a circuit according to a third embodiment of the present invention.

Similarly to the power supply circuit of FIG. 1, the power supply circuit shown in FIG. 9 is provided with a voltage resonance type converter on the primary side and a series resonant circuit on the secondary side.

Smoothing capacitors Ci1 and Ci2 are connected in series with each other, and fast recovery type diodes D1A and D1B perform voltage doubler rectifier operation. More specifically, a power factor improving rectifier circuit 10B in the switching power supply circuit is formed by removing the slow recovery type diodes Di1 and Di2 from the configuration of the power factor improving rectifier circuit 10 in FIG. 1.

The switching power supply circuit in the present embodiment is provided on the primary side with an externally excited voltage resonance type converter employing a MOSFET as a switching device Q10.

The switching device Q10 is driven for switching operation by an oscillating circuit 2 and a driving circuit 3.

Under control of a control circuit 1, the oscillating circuit 2 generates an oscillating signal having a desired frequency, and then outputs the oscillating signal to the driving circuit 3. On the basis of the oscillating signal, the driving circuit 3 generates a driving voltage for driving the switching device Q10, and then outputs the driving voltage to the switching device Q10. The control circuit 1 controls oscillation frequency of the oscillating circuit 2 according to a secondary-side direct-current output voltage E01.

Thus, the switching device Q10 performs externally excited switching operation, and also the direct-current output voltage is stabilized.

A rectifier circuit system formed by connecting a secondary-side series resonant capacitor C2, rectifier diodes D01 and D02, and a smoothing capacitor C01 in a manner as shown in the figure is provided on the secondary side of an isolating converter transformer PIT. Thus, the rectifier circuit system forms a voltage doubler half-wave rectifier circuit including a secondary-side series resonant circuit comprising the secondary-side series resonant capacitor C2 and a secondary winding N2.

The power factor improving rectifier circuit 10B is the same as the power factor improving rectifier circuit 10 in FIG. 1 except that the second rectifier circuit comprising the slow recovery type diodes Di1 and Di2 is not formed in the power factor improving rectifier circuit 10B. The fast recovery type diodes D1A and D1B forming a first rectifier circuit perform voltage doubler rectifier operation, and are switched by a current I3 superimposed in the first rectifier circuit by an alternating voltage generated in a tertiary winding N3. A conducting range of the fast recovery type diode D1B or D1A is thereby widened, which results in an improvement in the power factor.

Since the second rectifier circuit is not formed in the power factor improving rectifier circuit 10B, however, the current to be stored in the smoothing capacitor Ci is not shunted even around the peak values of the alternating-current input voltage VAC. Therefore, stable zero volt switching operation is limited to part of a desired alternating-current input voltage range or load variation range. Thus, when a power factor of 0.8 or less suffices, the power supply circuit can be used as a practical circuit capable of stable zero volt switching operation to improve AC/DC conversion efficiency and reduce ripple voltage.

While embodiments of the present invention have been described, various other modifications thereof are conceivable.

For example, complex resonance type switching converters provided with a full-wave rectifier circuit, a voltage doubler rectifier circuit, a voltage quadrupler rectifier circuit or the like employing the secondary-side series resonant circuit may be formed as modifications of the embodiments. Thus, the embodiments are not specifically limited by the configurations of the resonant circuit and the rectifier circuit on the secondary side.

In addition, while a so-called single-ended configuration provided with one switching device has been described as the voltage resonance type converter on the primary side, the present invention is also applicable to a so-called push-pull system, which switches two switching devices alternately.

While the preferred embodiment of the present invention has been described using specific terms, such description is for illustrative purposes only, and it is to be understood that changes and variations may be made without departing from the spirit or scope of the following claims.

What is claimed is:

1. A switching power supply circuit comprising:.
   voltage doubler rectifier means including a first pair of rectifier diodes connected in series, a second pair of diodes connected in series and connected via a coil in parallel with said first pair of rectifier diodes and a pair of smoothing capacitors connected in series for performing voltage doubler rectifier operation on an alternating-current input voltage;
   switching means including a switching device for interrupting a doubled direct-current voltage from said voltage doubler rectifier means;
   an isolating converter transformer including a primary winding, a secondary winding, and a tertiary winding for coupling a switching output fed to said primary winding from said switching means to said secondary winding and said tertiary winding;
   primary-side resonant means formed by at least a leakage inductance component of the primary winding of said isolating converter transformer and a capacitance of a primary-side parallel resonant capacitor for converting operation of said switching means into voltage resonance; and feedback means for feeding back a switching output voltage transmitted to said tertiary winding to said second pair of diodes connected in series.

2. The switching power supply circuit as claimed in claim 1, wherein said feedback means for feeding back said switching output voltage transmitted to said tertiary winding includes a series resonant capacitor connected in series with said tertiary winding.

3. The switching power supply circuit as claimed in claim 1, wherein a fast recovery type diode is used as each of said second pair of diodes connected in series ; and each of said pair of fast recovery type diodes performs rectification according to the switching output voltage fed back by said feedback means and thereby improves a power factor.

4. The switching power supply circuit as claimed in claim 1, further comprising:

a secondary-side resonant circuit formed on the secondary side by capacitance of a secondary-side resonant capacitor and a leakage inductance component of said secondary winding obtained by loosely coupling said primary winding and said secondary winding of said isolating converter transformer to each other;

direct-current output voltage generating means for rectifying an alternating voltage obtained in said secondary winding and thereby generating a secondary-side direct-current output voltage, the direct-current output voltage generating means including said secondary-side resonant circuit; and constant-voltage control means for effecting constant-voltage control of said secondary-side direct-current output voltage according to a level of said secondary-side direct-current output voltage.

5. The switching power supply circuit as claimed in claim 4, wherein said constant-voltage control means effects constant-voltage control of said secondary-side direct-current output voltage by controlling a resonance frequency of said primary-side resonant means according to the level of said secondary-side direct-current output voltage.

* * * * *